Patented Feb. 20, 1923.

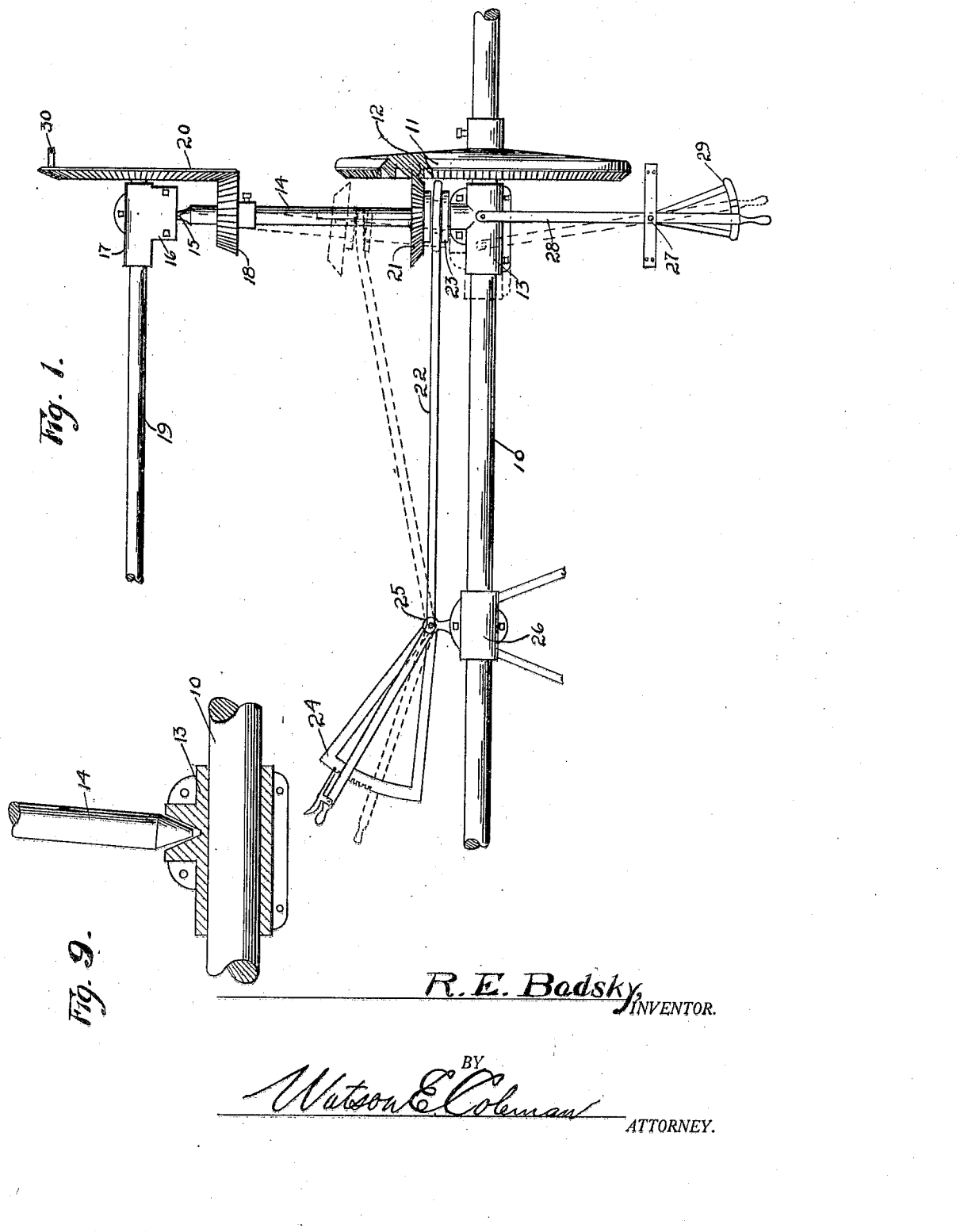

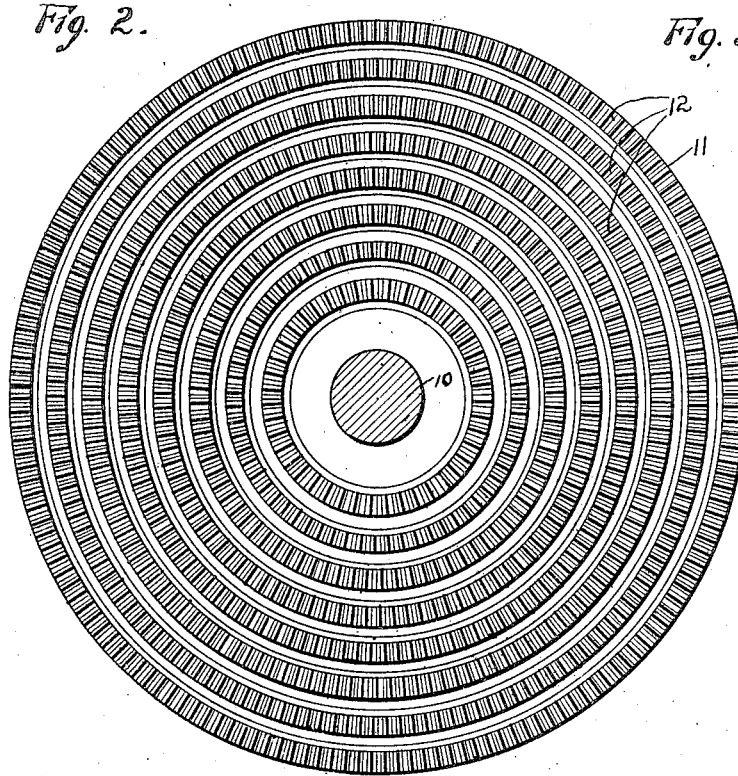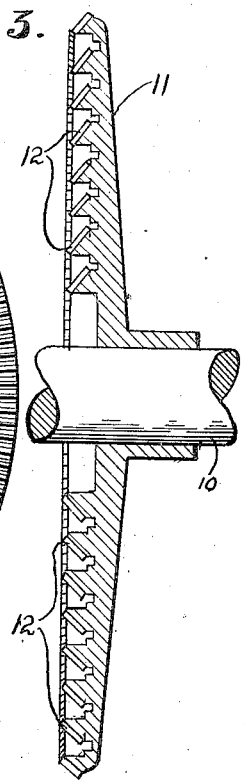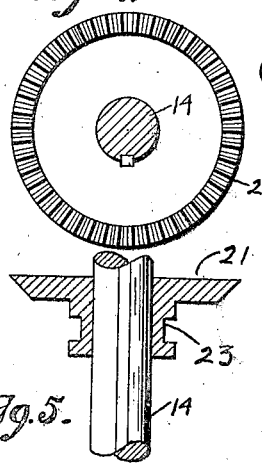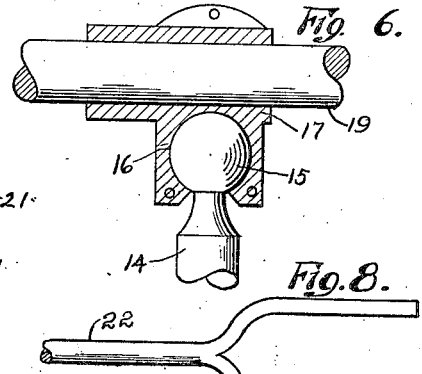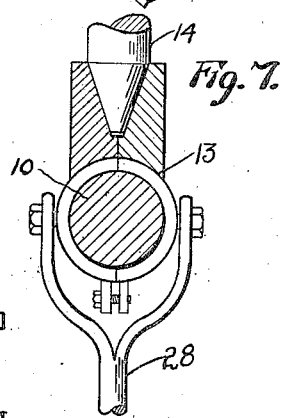

1,446,284

UNITED STATES PATENT OFFICE.

RAYMOND E. BADSKY, OF WICHITA, KANSAS.

VARIABLE-SPEED TRANSMISSION MECHANISM FOR AIR COMPRESSORS.

Application filed February 19, 1921. Serial No. 446,281.

*To all whom it may concern:*

Be it known that I, RAYMOND E. BADSKY, a citizen of the United States, residing at Wichita, in the county of Sedgwick and State of Kansas, have invented certain new and useful Improvements in Variable-Speed Transmission Mechanisms for Air Compressors, of which the following is a specification, reference being had to the accompanying drawings.

This invention relates to means for transmitting power, and particularly to means whereby the variable speed of driven and driving members may be changed, that is whereby the speed of a driven member may be varied.

The general object of the invention is to provide a mechanism of this kind which is particularly applicable for use in air compressing machinery.

A further object is to provide in a mechanism of this character a rotatable member having upon its face a series of toothed annuli concentric to the center of rotation of the member, and provide a shaft having a gear wheel thereon adapted to engage with any one of said annuli, and provide means whereby the gear wheel and the shaft upon which it is mounted may be shifted out of engagement with any one annulus and the gear wheel shifted longitudinally along its shaft and then shifted into engagement with any other annulus to thus secure different driving ratio.

And a further object is to provide means whereby the gear wheel may be shifted out of engagement with the rotatable member carrying the gear teeth so as to prevent the transmission of power to the compression pump or other mechanism.

Other objects will appear in the course of the following description.

My invention is illustrated in the accompanying drawings, wherein:—

Figure 1 is a side elevation of a power transmission mechanism constructed in accordance with my invention;

Figure 2 is a face view of the gear wheel 11;

Figure 3 is a diametrical section thereof;

Figure 4 is a face view of the gear wheel 21, the shaft 14 being in section;

Figure 5 is a cross section thereof;

Figure 6 is a sectional view of the upper bearing 17;

Figure 7 is a vertical sectional view through the lower bearing;

Figure 8 is a plan view of the end of the lever 22;

Figure 9 is a sectional view of the bearing for the lower end of the shaft 14 showing the position of this shaft in the bearing when the shaft is tilted.

Referring to these drawings, 10 designates a driving shaft intended to be driven from an engine in any suitable manner and carrying upon it the disk 11. This disk is provided with a plurality of bevel faced toothed annuli 12 constituting a series of gear wheels. Mounted upon the shaft 10 for sliding movement with relation thereto toward or from the disk 11 is a slide 13 which forms a step bearing for a shaft 14. The opposite end of this shaft is formed with a globular head 15 which has thus a universal joint connection in a socket 16 formed in a supporting bracket or like member 17. Mounted upon the shaft 14 is a bevelled gear wheel 18 and passing through the bracket 17 is a driven shaft 19 having thereon a bevelled gear wheel 20 engageable with the bevelled gear wheel 18.

Also carried upon the shaft 14 is a longitudinally shiftable bevelled gear wheel 21 which is adapted to mesh with any one of the bevelled toothed annuli 12. This gear wheel 21 is splined upon the shaft 14 but is longitudinally shiftable therealong by any suitable gear shifting mechanism. I have illustrated for this purpose a lever 22 which embraces an annularly grooved collar or hub 23 formed on the gear wheel 21, this lever being angular in form, and the other end of the lever passing over an arcuate rack 24, the lever being provided with means whereby it may be locked in any desired position on the sector 24. This lever is illustrated as being pivotally mounted upon a bracket 25 extending from a boxing 26 through which the driving shaft 10 passes.

Pivotally connected to the sliding bearing 13 and fulcrumed at 27 is a lever 28, the outer end of which extends over an arcuate rack 29, this lever having means whereby it may be locked to the rack at any desired adjusted position.

In the operation of this mechanism, when it is desired to change the speed of the shaft 19 relative to the shaft 10, the lever 28 is shifted to shift the sliding bearing 13 away from the disk 11, thus carrying the gear wheel 21 out of engagement with the gear annulus with which it was previously engaged. As soon as it is out of engagement, the lever 22 is shifted to shift the gear 21 to any desired position along the shaft 14 and then the slide 13 is shifted again toward the disk 11, carrying the gear wheel 21 into engagement with the pivoted annulus. I have illustrated eight annuli on the disk 11 and, therefore, it will be seen that eight different speeds may be secured for the driving shaft by shifting the gear wheel 21 into engagement with any one of the annuli. If it be desired to disconnect the shaft 19 entirely from the driving means, then the lever 28 is operated to shift the slide 13 away from the disk 11 and is held in this position so that the gear toothed annuli 12 and the gear wheel 21 are out of engagement.

I have particularly designed this device for use for transmitting power from any suitable motor or engine to air compressing apparatus, but I do not wish to be limited thereto, as it is obvious that the mechanism might be applied in a large number of different circumstances for the transmission of power. I have illustrated the gear wheel 20 as being provided with a wrist pin 30 constituting a crank whereby an air pump may be driven and the size of the gear wheel and the length of stroke, of course, will depend upon the purpose of the transmission mechanism. Where the mechanism is to be used for pumping air for power purposes, the mechanism would be built and geared to furnish sufficient air pressure when the gear wheel 21 was engaged with any one of the annuli close to the shaft 10. If at any time there was too much pressure, the air pump could be made idle by simply disconnecting the gear 21 entirely from the teeth on the disk 11. The higher gears on the disk 11 would be used in an emergency. As before stated, I do not wish to limit myself however, to the use of this device with an air pump, though I have designed it for this purpose.

I claim:—

A power transmission mechanism of the character described comprising a driving shaft and a driven shaft, a disk upon the driving shaft having a plurality of toothed annuli, bearings for each of said shafts receiving the shafts intermediate the ends thereof, the bearing of the driving shaft being shiftable toward and away from said disk, a shaft having its ends oscillatably and rotatably mounted in the adjacent faces of said bearings, a pinion splined upon the last named shaft and shiftable thereon to engage any of the annuli of said disk, a pinion carried by the opposite end of the shaft, a gear carried by the driven shaft and with which said pinion is adapted to mesh, means for shifting the bearing of said driving shaft, and means for shifting said pinion upon the last named shaft, said driving and driven shafts being substantially parallel.

In testimony whereof I hereunto affix my signature.

RAYMOND E. BADSKY.